United States Patent Office 2,732,639
Patented Jan. 31, 1956

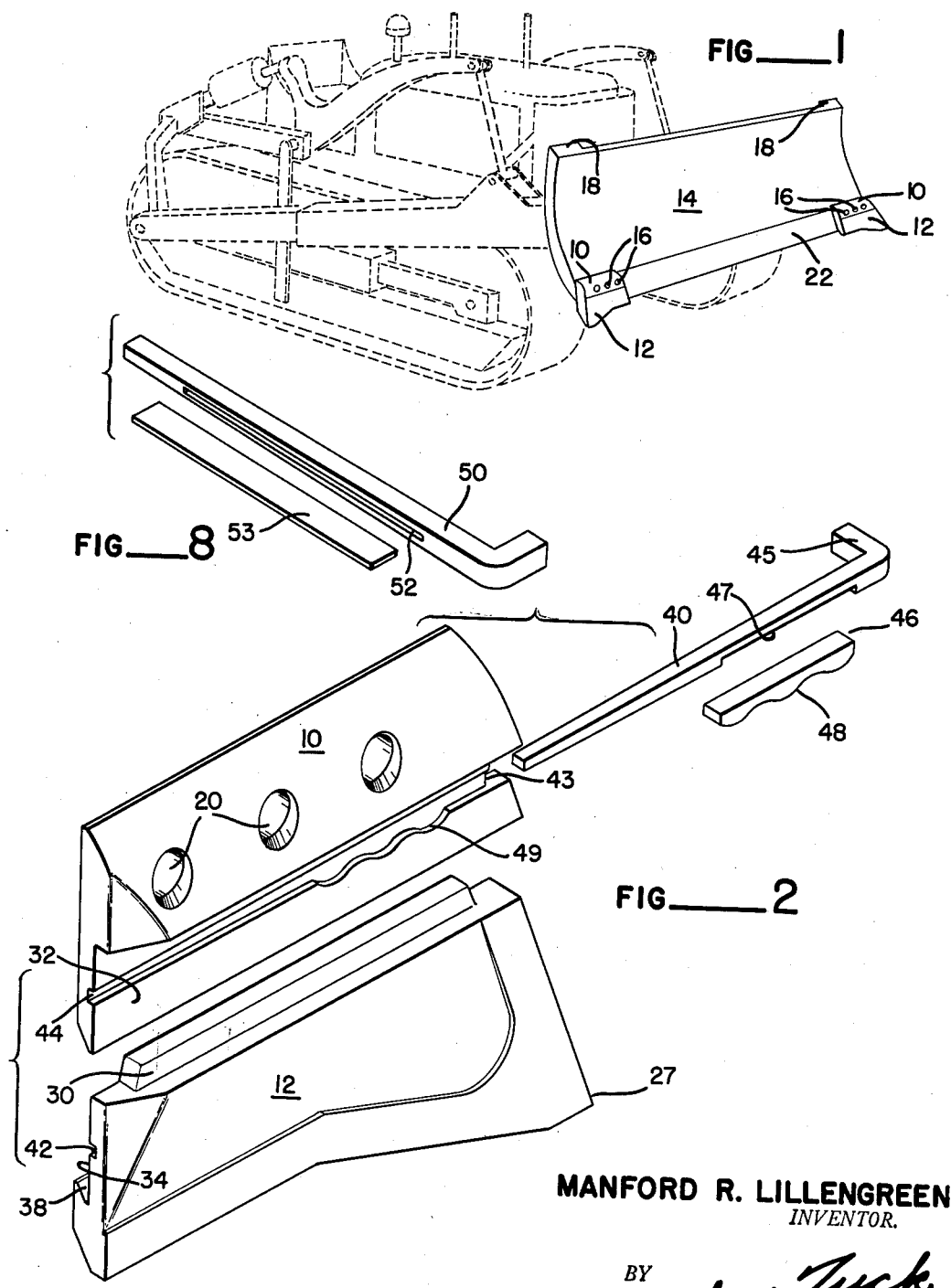

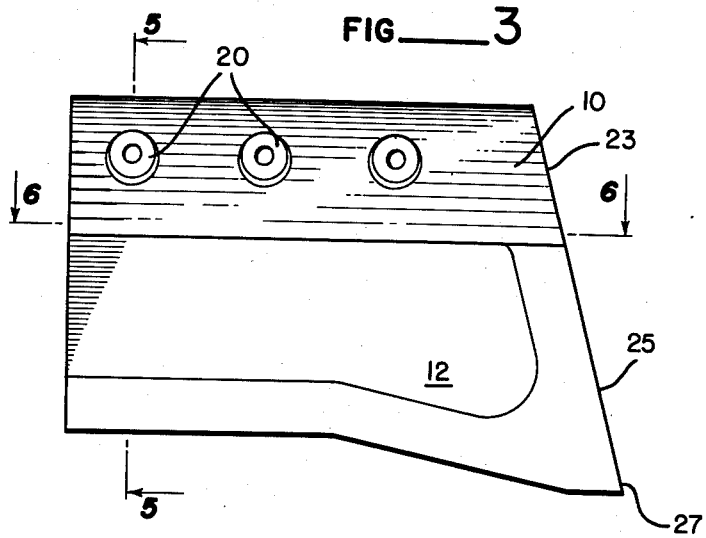
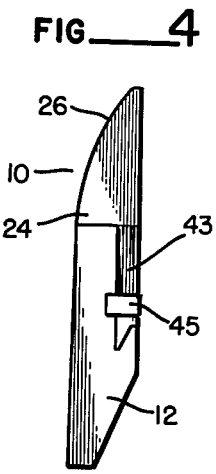
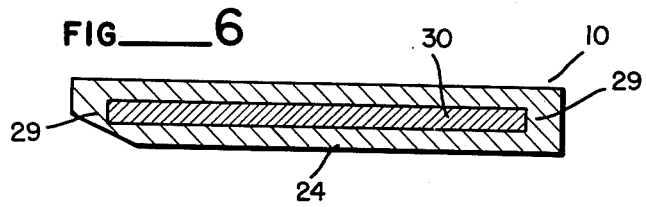
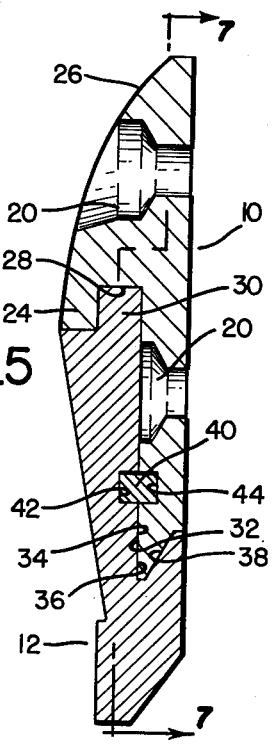
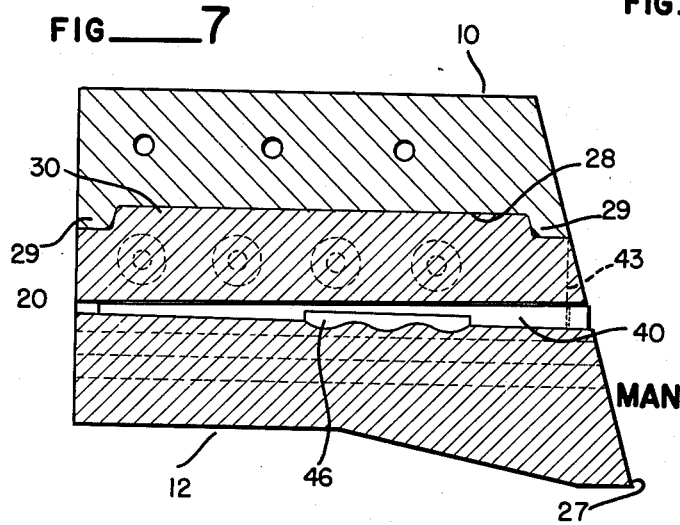

2,732,639

REPLACEABLE CORNER PORTION FOR THE CUTTING EDGE OF BULLDOZER BLADES

Manford R. Lillengreen, Des Moines, Wash.

Application March 30, 1953, Serial No. 345,540

3 Claims. (Cl. 37—143)

This present invention comprises a corner mounting unit for each end of the cutting edge of a bulldozer blade. The device consists of two essential parts, one a base member which is very securely affixed to the bulldozer blade and the mounting frame therefor, as by a plurality of heavy bolts or rivets, and then a cutting edge member which is arranged to interlock with the backing or mounting member so that it can be held properly in place with dowel and key means, to the end that it can be quickly removed when dull or damaged and a replacement quickly made.

It is well known that many different manufacturers have provided corner members for the blade of bulldozers, graders, and like working equipment, all with the intent of providing a unit that could be replaced without having to replace the entire cutting edge. There is a real demand for such a structure in that almost invariably the corners are the portions of the cutting blade that dull most readily and are subject to the greatest danger of fracture and other damage. In the past, in order to provide secure mountings for the replaceable corner, it has been deemed necessary to very securely bolt the same in place, and then, after a period of use, it is found very difficult to remove the corner due to slight deformation of the bolt and the like, resulting from the heavy service to which these corners are subjected. Experience has proven that in actual use many of these replaceable corners thoroughly fail in their intended purpose, in that they are not easily replaceable and the resulting loss of time in making the replacement inclines many operators to periodically replace the entire lower cutting edge of the blade as the most practical solution of the problem.

This present invention, however, is believed to quite thoroughly overcome the disadvantage of these replaceable corners, as observed in the past, in that a base or backing member is provided, usually of cast steel or of manganese steel which can be very securely affixed to the bulldozer moldboard and frame. The actual cutting corner is made so that it interlocks over relatively large bearing surfaces within the backing member, so that it can take tremendous strains and shock without damage to the securing means. To follow out the plan of having the actual cutting corner easily replaceable, key members are provided in the form of both fixed and removable longitudinally disposed keys which effectively hold the cutting edge in position, but which themselves accept only the longitudinal thrust of the corners and do not accept any portion of the heavy vertical thrust that may be placed upon the two units. This is believed to be a very worthwhile development in that the actual cutting corner can be of whatever type of material is proved to be best adapted to the purpose. Conditions dictate the exact type of material but it normally will range from cast steel of the high manganese content types to actually being formed out of high grade tool steel which can be heat treated. The use of the higher priced steel indicates that the replaceable unit should be relatively small, and that is readily achieved with this present construction. It also permits the removal of the cutting edge so that the same may be redressed and reused a number of times, much as the plowshare of the ordinary moldboard plow is always subjected to repeated reworking or sharpening.

The principal object of this present invention, therefore, is to provide a two-piece corner unit for mounting on the corners of bulldozer blades and blades of like equipment, which will give an excellent chance for securely fastening the base member to the bulldozer blades and have an easily and quickly removable cutting edge of relatively small size so that it may be easily handled.

A further object of this invention is to provide a two-piece unit for each cutting corner of a bulldozer, or earth working machine blade, in which one part is securely anchored to the blade, and the other portion dovetails into the fixed base portion, so that any pressure that can normally be applied to the cutting edge is absorbed and transferred by the extreme corner to the base member which is adequate to accept the thrust from all normal working angles.

A further object is to provide that the cutting edge is held to the base member by fixed and by easily removable key members, to the end that they can be depended upon to function in that they cannot be distorted by the application of unusual vertical thrust loads on the cutting blades.

Further objects, advantages and capabilities will be apparent from the description and disclosure in the drawings, or may be comprehended or are inherent in the device.

Figure 1 is a perspective view showing the general features of a bulldozer with corners after the teachings of the present invention applied thereto;

Figure 2 is an enlarged perspective view of one corner assembly, the two parts thereof being separated slightly and with the removable key removed and disassembled to more fully illustrate the construction;

Figure 3 is a front elevation of the corner assembled as a whole;

Figure 4 is an end view of the showing of Figure 3;

Figure 5 is a vertical sectional view taken along the line 5—5 of Figure 3;

Figure 6 is a horizontal sectional view taken along the line 6—6 of Figure 3;

Figure 7 is a vertical, sectional view taken along the broken line 7—7 of Figure 5;

Figure 8 is an exploded perspective view illustrating an alternate form of resilient key lock.

Referring more particularly to the disclosure in the drawings, the numerals 10 and 12 designate respectively the mounting base or backing plate of the corner unit and the removable cutting edge and corner element. The backing plate or base 10 is designed to be very securely fastened to the moldboard 14 of a bulldozer by a plurality of large bolts 16. One or more of these bolts normally passes through the framing, as 18, of the bulldozer moldboard. Bolts 16 are preferably installed with their heads in beveled recesses 20, formed in backing plate 10 so that they will not present any place for the lodgment of roots or other debris which might interfere with the effective cutting of the bulldozer blade 22, or the corner assemblies with their cutting elements 12. The backing plate 10 and corner element 12 are normally flared outwardly as at 23 and 25 respectively so that the extreme corner 27 will be outstanding beyond the moldboard 14.

The upper portion of the back plate is very substantially constructed, having its maximum thickness at 24, and the beveled or rounded portion 26 above the same. Within the thick portion 24 is formed an elongated recess or slot 28. This slot extends substantially through the length of the back plate 10 except for the solid stop lugs 29 and a considerable thickness of metal is provided on each side of the slot, so that the key member 30, of blade portion 12, will have a very strong abutment at each side and will thus be able to offer very substantial resistance to any crowding of the cutting blade 12, as so often occurs when the bulldozer blade is used to dig into compacted material or to root out rocks, stumps, and the like.

The lower portion of back plate 10 is formed with a bearing surface at 32 so as to form a seat for the coacting bearing surface 34 of the cutting portion 12. To complete the interlocking of the two members, the bottom of the back plate 10 is beveled at 36 so as to form a secure seat within the reentrant beveled portion 38 of number 12. This beveled engagement extends the full length of members 10 and 12 and should have substantial proportions, as shown in Figure 3, so that it will have adequate strength to take the relatively heavy thrust occasioned in a normal use of the bulldozer.

It will be understood, it is believed, that the key member 30 with its associated slot 28, and the beveled engagement provided by beveled portions 36 and 38, are adequate for any possible thrust or shock loads that can be placed upon it, through the operation of the bulldozer. It is, however, necessary to secure member 12 to member 10 by some quick releasing means. Now it has been found that bolts are not satisfactory. Bolts must fit snugly in holes in the two elements, and then a slight amount of movement of members 10 and 12, with respect to each other, tends to place the bolts in shear and to deform them, so that it is difficult to withdraw them when a change is to be made.

It has been found, on the other hand, that there is very little dead weight loading on the securing members, due to the frictional engagement of the main bearing surfaces, and experience has proven that a long key member as 40 can perform a keying function that is most ideal, and this is the construction shown throughout the drawings. To this end I have provided coacting openings, as 42, in members 12 and 44 in the back plate 10. A preferred arrangement of key 40 is illustrated in Figure 2 in which the key portion is tapered, preferably in each plane. It is provided with a gib-head 45. In order to hold key 40 resiliently in position to take care of the shock and jar of the bulldozer, a resilient keeper member 46 is provided. This may be made of any yieldable material such as rubber or neoprene or leather and is set into a recess 47 formed on one side of key 40. The opposite side of keeper member 46 is preferably deformed, as illustrated, for instance, at 48, and a coacting deformation provided at 49 in the wall of keyway 44. The companion keyways 42 and 44 should conform to the general shape of key 40. However this key 40 does not have to be particularly heavy. This is due to the fact that the only requirement placed upon it is that it hold the cutter portion 12 up into engagement with the backing plate 10. All the normal strains placed upon cutters 12 are fully taken up with the interlocking parts of members 10 and 12, thus relieving the key 40 of any particular strain, aside from the actual weight of the part which it supports. In Figure 8 I have illustrated a modified form of the key designated as 50 and in this I have provided a through slot 52 into which is adapted to seat the resilient keeper member 53. With such an arrangement keeper member 53 engages the bottom of both of the keyways 42 and 44. In addition to this keyway 44 a portion of the back plate 10 is relieved as at 43 to receive gibbed end portion 45 of key 40. This permits the key 40 to be positioned entirely behind the cutting element 12 so as not to be dislodged accidentally. When the cutter 12 is to be changed, however, a tool may be driven down along the edge of cut 43 in behind the gib-head 45 and thus force key 40 out of the keyways 42 and 44.

The proportions shown, especially in Figure 2, are satisfactory in that a considerable area is provided to accept the shear action present when corner plate 12 tends to move longitudinally with respect to member 10. Key 30 presents ample end surface in abutting relationship with stop lugs 29. Lugs 29 are amply strong and are part of backing plate 10. The key is a solid part of plate 12 and as will be noted in Figure 6 a very strong structure is provided. This permits the key and lug assembly to accept the entire shear load without danger of deformation which in turn might interfere with the removal of plate 12.

It is believed it will be clearly apparent from the above description and the disclosure in the drawings that the invention comprehends a novel construction of a replaceable corner portion for the cutting edge of bulldozer blades.

Having thus disclosed the invention, I claim:

1. The improvement in a bulldozer blade or the like, comprising: a moldboard, a two-piece corner assembly positioned in each lower end corner of said moldboard to form a replaceable blade corner comprising an upper mounting base and a lower removable blade member, said mounting base rear wall being in substantially full abutment with said moldboard from its upper to its lower margin, the front wall of the mounting base upper portion overhanging the front wall of the lower portion thereof forming a medial jutted wall therebetween which has a downwardly open groove including side and end groove walls and the rear wall of the groove being substantially coplanar with said lower portion front wall, said blade member having an upper portion lapping said front wall of said mounting base lower portion in substantially full abutment throughout its extent and having an upstanding marginal tongue on its top closely fitting said groove, the bottom of said mounting base extending sharply upwardly and rearwardly in a short bottom wall from the front wall to the rear wall thereof and to said moldboard forming a depending beveled marginal tongue and said blade member having a shallow corresponding and closely fitting medial groove in which said beveled tongue is positioned and the lower portion of said blade member below said groove therein being in abutment with said moldboard, a plurality of upper bolts securing said mounting base upper portion to said moldboard and said mounting base lower portion having a plurality of countersunk openings and a plurality of lower bolts positioned in said countersunk openings and secured to said moldboard and covered by said blade member, and the blade member rear wall and the mounting base front wall medially of said grooves having aligned horizontally elongated keyways open at one end thereof and a key positioned in said keyways through the open end thereof and securing said blade member against downward movement.

2. The subject matter of claim 1 in which at least one of said keyways and an aligned portion of said key have recesses and a resilient keeper member positioned in said recesses under compression securing said key in place until the key is struck out by externally applied force.

3. The improvement in a bulldozer blade or the like, comprising: a moldboard, a two-piece corner assembly positioned in each lower end corner of said moldboard to form a replaceable blade corner comprising an upper mounting base and a lower removable blade member, said mounting base rear wall being in abutment with said moldboard, the front wall of the mounting base upper portion overhanging the front wall of the lower portion thereof forming a medial jutted wall therebetween which has a downwardly open groove with closed side and end walls, said blade member having an upper portion lapping said front wall of lower portion of said mounting base lower portion substantially throughout its extent and having an upstanding marginal tongue on its top closely fitting said groove, the bottom surface of said mounting base forming a short depending beveled marginal tongue and said blade member having a corresponding and closely shallow fitting medial groove in which said beveled tongue is positioned and the lower portion of said blade member below said groove therein being in abutment with said moldboard, a plurality of upper bolts securing said mounting base upper portion to said moldboard and said mounting base lower portion having a plurality of openings and a plurailty of lower bolts positioned in said openings and secured to said moldboard and covered by said blade member, and the blade member and the mounting base having locking means medially of said grooves normally securing them against downward movement of said blade member relative said mounting base preventing disengagement of said tongues and grooves, said locking means being disengageable for removal of said blade member.

References Cited in the file of this patent

UNITED STATES PATENTS

| | | |
|---|---|---|
| D. 143,353 | Rockwell | Dec. 25, 1945 |
| 2,092,311 | Hosmer et al. | Sept. 7, 1937 |
| 2,259,456 | Crawford | Oct. 21, 1941 |
| 2,275,390 | Lawler | Mar. 3, 1942 |
| 2,312,802 | Crawford | Mar. 2, 1943 |
| 2,483,032 | Baer | Sept. 27, 1949 |
| 2,610,417 | Crawford | Sept. 16, 1952 |

OTHER REFERENCES

Engineering News Record, March 20, 1952, vol. 148, No. 12, p. 125.